United States Patent Office 3,801,571
Patented Apr. 2, 1974

3,801,571
3-CARBAMOYLOXIMINO-AZACYCLOHEPTAN-2-ONES
Erika Reichel, Kussnacht am Rigi, and Karl Gatzi, Basel, Switzerland, assignors to Ciba-Geigy Corporation, Ardsley, N.Y.
No Drawing. Filed June 30, 1970, Ser. No. 51,354
Int. Cl. C07d 53/06
U.S. Cl. 260—239.3 R    3 Claims

ABSTRACT OF THE DISCLOSURE

New 3-carbamoyloximino-azacycloheptan-2-ones of the formula

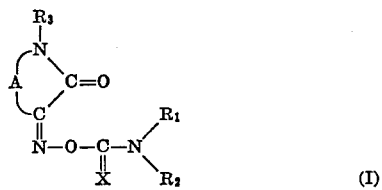

wherein
A is a tetramethylene radical optionally substituted by lower alkyl with 1 to 4 carbon atoms,
$R_1$ is hydrogen, an alkyl or alkenyl radical or a cycloalkyl radical optionally substituted by alkyl which radical has at most 20 carbon atoms,
$R_2$ is an alkyl or alkenyl radical or a cycloalkyl radical optionally substituted by alkyl, which radical has at most 20 carbon atoms, or an aryl or aralkyl radical, which is unsubstituted or substituted by halogen atoms, lower alkyl, alkoxy or halogenoalkyl groups with 1 to 4 carbon atoms,
the symbols $R_1$ and $R_2$ together with the adjacent nitrogen atom are a 3- to 10-membered heterocyclic radical,
$R_3$ is hydrogen or the group

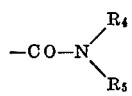

in which $R_4$ and $R_5$ independently are hydrogen atoms, lower alkyl group with 1 to 4 carbon atoms, cycloalkyl, aryl or aralkyl radicals, and
X is an oxygen or sulfur atom, are described. These compounds have excellent insecticidal, acaricidal, nematocidal and fungicidal activity. They are particularly valuable due to their pronounced systemic action. Pesticidal and fungicidal compositions containing these new substances as well as a method for the control of pest and fungi using these new substances are given.

DETAILED DISCLOSURE

The present invention concerns new 3-carbamoyloximinoazacycloheptan-2-ones, process for the production thereof, in addition pesticides containing these new compounds as active ingredients, method for the control of pests using the new active substance or compositions containing them.

The new 3-carbamoyloximino-azacycloheptan-2-ones correspond to the Formula I:

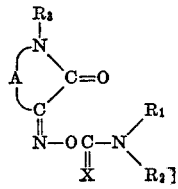

In this formula:
A is a tetramethylene radical optionally substituted by lower alkyl with 1 to 4 carbon atoms,
$R_1$ is hydrogen, an alkyl or alkenyl radical or a cycloalkyl radical optionally substituted by alkyl which radical has at most 20 carbon atoms,
$R_2$ is an alkyl or alkenyl radical or a cycloalkyl radical optionally substituted by alkyl, which radical has at most 20 carbon atoms, or an aryl or aralkyl radical, which is unsubstituted or substituted by halogen atoms, lower alkyl, alkoxy or halogenoalkyl groups with 1 to 4 carbon atoms,
the symbols $R_1$ and $R_2$ together with the adjacent nitrogen atom are a 3- to 10-membered heterocyclic radical,
$R_3$ is hydrogen or the group

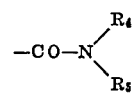

in which $R_4$ and $R_5$ independently are hydrogen atoms, lower alkyl group with 1 to 4 carbon atoms, cycloalkyl, aryl or aralkyl radicals, and
X is an oxygen or sulfur atom.

In Formula I, alkyl radicals $R_1$ and $R_2$ designate straight or branched-chain radicals having 1 to 20 carbon atoms. Suitable as alkenyl radicals $R_1$ and $R_2$ are preferably lower radicals having 2 to 6 carbon atoms, such as the allyl or methallyl radical, a propenyl or butenyl radical. Cycloalkyl radicals designate monocyclic and polycyclic radicals which, in particular, may be substituted by lower alkyl. The following radicals are suitable: the cyclopropyl, cyclopentyl, cyclohexyl, bicyclo[4.1.0]heptyl, bornyl, norbornyl, 3-methyl-6-isopropyl-cyclohexyl (menthyl), cyclooctyl, bicyclo[5.1.0]octyl, bicyclo[6.1.0]nonyl, octahydro-1,2,4-methenopentalenyl radicals, etc. An aryl radical $R_2$ is primarily a phenyl radical, and an aralkyl radical $R_2$ the benzyl or phenethyl radical. Substituents of a phenyl, benzyl or phenethyl radical which may be mentioned are halogen, preferably chlorine and/or bromide, halogeno-alkyl, in particular trifluoromethyl, lower alkyl and alkoxy. These aromatic radicals may have one or several of these substituents which may be the same or differ. A 3- to 10-membered heterocyclic radical formed by $R_1$ and $R_2$ and the adjacent nitrogen atom is preferably saturated and may contain other hetero atoms such as another nitrogen atom, an oxygen atom and/or a sulfur atom; suitable examples thereof are the radicals of the following heterocyclic compounds: aziridine, pyrrolidine, piperidine, piperazine, 4-methylpiperazine, morpholine, azepine, thiazepine, etc. Suitable as alkyl substituents of the tetramethylene bridge and as lower alkyl radicals $R_3$ and $R_4$ are, in particular, such as the methyl, ethyl, propyl, isopropyl, n-butyl, sec-butyl and tert-butyl radicals. Cycloalkyl radicals $R_4$ and $R_5$ are preferably the cyclopentyl, cyclohexyl and cycloheptyl groups, the preferred aralkyl radicals $R_4$ and $R_5$ are the benzyl and phenylethyl groups.

The new 3-carbamoyloximino-azacycloheptan-2-ones of Formula I are produced according to the instant invention by reacting a hydroxy-imino-azacycloheptanone of the Formula II

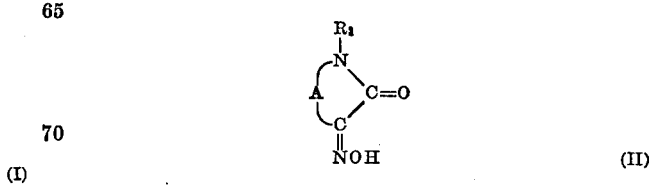

(a) with carbamic acid halide of the Formula III $$\text{Hal}-\underset{\underset{X}{\|}}{C}-N\diagup_{R_2}^{R_1} \qquad (III)$$

or if $R_3$ is hydrogen, with two carbamic acid halides of the Formula IIIa $$\text{Hal}-\underset{\underset{O}{\|}}{C}-N\diagup_{R_5}^{R_4} \qquad (IIIa)$$

in the presence of an acid-binding agent, or
(b) with the individual components of the carbamic acid halide of Formula III, namely phosgene or thiophosgene and an amine of Formula IV $$\text{HN}\diagup_{R_2}^{R_1} \qquad (IV)$$

in the presence of an acid binding agent, or
(c) in those cases where $R_1$ is hydrogen with an isocyanate of the Formula V $$R_2NCO \qquad (V)$$

or if $R_3$ and $R_4$ are also hydrogen with two molecules of isocyanate of the Formula Va $$R_5NCO \qquad (Va)$$

optionally in the presence of a catalyst or
(d) by reacting a carbamoyl-imino-azacycloheptanone of the Formula VI $$A\underset{C}{\overset{NH}{\diagdown}}\underset{N-O-\underset{\underset{X}{\|}}{C}-N\diagup_{R_2}^{R_1}}{C=O} \qquad (VI)$$

with a carbamic acid halide of the Formula IIIa in the presence of an acid-binding agent, or
(e) with the individual components forming the carbamic acid halide of Formula IIIa, namely phosgene and an amine of the Formula IVa $$N\overset{H}{\underset{}{}}\diagup_{R_5}^{R_4} \qquad (IVa)$$

in the presence of an acid-binding agent, or
(f) in those cases where $R_4$ is hydrogen with an isocyanate of the Formula Va optionally in the presence of a catalyst.

In the Formulas II to VI, $R_1$, $R_2$, $R_3$, $R_4$, $R_5$ and A as well as X have the meanings given for Formula I, Hal designates chlorine or bromine.

A modification of the above-described process for the production of the new carbamoyloximino-azacycloheptanones of Formula I in which $R_1$ and/or $R_4$ is hydrogen is the reaction of a mixture of an isocyanate of Formula V or Va and the corresponding N-alkyl-carbamic acid halide of Formula III or IIIa.

The reactions according to the invention are performed in the presence of acid-binding agents such as inorganic bases, for example hydrides, hydroxides and carbonates of alkali and alkaline earth metals, and organic nitrogen bases, for example tertiary amines such as pyridine, triethylamine, dimethylaniline, etc. Furthermore, as catalysts in the reaction with the isocyanates of Formula V, e.g. tertiary amines or organotin compounds are employed. It is preferable to perform the reactions in solvents and diluents which are inert towards the reaction components, for example in ethers and ether-type compounds such as diethyl ether, dipropyl ether, dioxane, tetrahydrofuran; ketones such as acetone, methyl ethyl ketone; amides such as N,N-dialkylated carboxylic acid amides; as well as halogenated hydrocarbons or aliphatic and aromatic hydrocarbons.

The new carbamoyloximino-azacycloheptan-2-ones are obtained by the process according to the invention in good to very good yields. They are soluble and stable in the usual organic solvents and partly also in water.

It is known that oximes can exist in two stereoisomeric forms, the syn- and the anti-form. The carbamoyloximinoazacycloheptan-2-ones of Formula I exist in these two forms. In the scope of the instant invention, therefore, the term "carbamoyloximino-azacycloheptan-2-ones of Formula I" should be understood to represent both of these stereoisomeric forms.

The starting materials of Formula II used for the reactions according to the invention are known compounds and can be produced by known methods.

The new carbamoyloximino-azacycloheptanones of Formula I are excellent insecticides, acaricides, nematocides and soil fungicides. These active substances are particularly valuable due to their pronounced systemic action, being not only effective against insects and arachnids, but also against nematodes and fungi. Besides, these active substances have a favorable toxicity for warm-blooded animals and are not phytotoxic, so that they can be used in the protection of plants, stored goods and for the disinfection of the soil.

The carbamoyloximino-azacycloheptanones of the limited Formula Ia $$A\underset{C}{\overset{NH}{\diagdown}}\underset{NO-\underset{\underset{O}{\|}}{C}-N\diagup_{R'_2}^{R'_1}}{C=O} \qquad (Ia)$$

wherein
$R'_1$ is hydrogen or a lower alkyl radical with 1 to 4 carbon atoms,
$R'_2$ is an alkyl or alkenyl radical, a cycloalkyl radical optionally substituted by lower alkyl, which radical has at most 20 carbon atoms, the phenyl, benzyl or phenethyl radical, a phenyl radical substituted by halogen, lower alkyl or alkoxy groups with 1 to 4 carbon atoms, nitro or a benzyl or phenethyl radical substituted by halogen, lower alkyl group with 1 to 4 carbon atoms, or
$R'_1$ and $R'_2$ together with the adjacent nitrogen atom are a 3- to 7-membered heterocyclic radical which can contain other heteroatoms, and
A has the meanings given for Formula I, possess especially good insecticidal, acaricidal, nematocidal and soil-fungicidal properties.

Tests of the effectiveness of the compounds of Formula Ia on insects and arachnids showed that these active substances are effective as stomach poisons and in addition have an excellent systemic insecticidal action on biting and sucking insects.

Thus it has been found that the active substances of Formula I show an excellent, long-lasting effect against insects of the families Muscidae, Stomoxidae, Culicidae, Curculionidae, Bruchididate, Dermestidae, Tenebrionidae, Chrysomelidae, Pyralididae, Blattidae, and in addition an excellent systemic insecticidal effect against insects of the families Aphididae, Pseudococcidae and Locustidae.

The new carbamoyloximino - azacycloheptanones of Formula I also show excellent acaricidal and systemic-acaricidal effects against normally sensitive and resistant mites, for example mites belonging to the families Tetranychidae, Eriophyidae and Tarsonemidae. The new compounds not only kill the mobile stages (larvae, protonyphs, deutonymphs and adults), but also the dormant stages (nymphochrysalis, deutochrysalis and teleiochrysalis) as well as the eggs within a few days.

The new carbamoyloximino-azacycloheptanones of Formula I have extraordinarily good nematocidal and systemic-nematocidal properties, for example against the following plant parasitic nematodes: Meloidogyne spp., Heterodera spp., Ditylechus spp., Pratylenchus spp., Paratylenchus spp., Anguina spp., Helicotylenchus spp., Tylenchorhynchus spp., Rotylenchulus spp., *Tylenchulus semipenetrans, Radopholus simulus,* Belonolaismus spp., Trichodorus spp., Longidorus spp., Aphelenchoides spp., Xiphinema spp.

By treating the areal parts of the plant a systemic effect is obtained, which also becomes manifest in the roots.

In admixture with synergists and auxiliaries having a similar action such as succinic acid dibutyl ester, piperonyl butoxide, olive oil, peanut oil, etc., the range of action of the active substances according to the invention is broadened and, in particular, the insecticidal and acaricidal action is improved. In the same manner, the effect can be substantially increased by the addition of other insecticides such as phosphoric, phosphonic,, thiophosphoric and dithiophosphoric acid esters and amides, carbamic acid esters, halogenated hydrocarbons and analogues of DDT active substance, as well as pyrethrines and synergists thereof, other acaricidally active substances such as halogeno-benzilic acid esters, e.g. 4,4'-dichlorobenzilic acid esters, 4,4'-dibromobenzilic acid ester, insecticidal and acaricidal carbamates, e.g. oxime carbamates, aryl carbamates and carbamates of enolizable heterocyclic compounds, etc.

Systemic insecticidal effect

To determine the systemic insecticidal effect, an aqueous emulsion containing 0.48% of the active ingredient (obtained from a 10% emulsifiable concentrate) is poured in a concentration of 50 ml. per 600 cm.$^3$ of soil on to the soil of potted potato, horsebean and cotton plants.

After 24 hours 5 potato beetle larvae in the 2nd larval stage (*Leptinotarsa decemlineata*) were placed on the parts of the potato plants above the soil, bean aphids (*Aphis fabae*) on the horsebean plants, and 10 cotton bug larvae (*Dysdercus fasciatus*) in the 5th larval stage on the cotton plants. In the following table, the length of time is given until all the animals which had be placed on the plants are in dorsal position. (Length of the test=3 days, temperature 25–30° C.)

TABLE

| Active substance | Potato bettle larvae, days | Bean aphids, days | Cotton bug larvae, days |
|---|---|---|---|
| 3-(methyl-carbamoyloximino)-azacyclo-heptan-2-one | 1 | 1 | 3 |
| 3-(ethyl-carbamoyloximino)-azacyclo-heptan-2-one | 2 | 3 | 3 |

Acaricidal effect

To test the acaricidal effect, leaves of bean plants which are infested with adults, dormant stages and eggs of red spider mites (*Tetranychus urticae*), are treated with 0.1%, 0.05% and 0.01% aqueous emulsions of the substance to be tested (produced from a 25% emulsifiable concentrate). The concentration of active substance is determined which causes 100% mortality after 6 days. As test animals, red spider mites which are resistant against phosphoric acid esters are used.

TABLE

| Active substance | 100% mortality within 6 days at concentrations of active substance of x, percent | | |
|---|---|---|---|
| | Adults | Dormant stages | Eggs |
| 3-(methyl-carbamoyloximino)-azacycloheptan-2-one | 0.01 | 0.05 | 0.05 |

Systemic acaricidal effect

Two bean plants in a pot with 500 g. of soil are sprinkled with aqueous solutions of the active substances in the given concentrations. After 7 days, 5 female spider mites are placed on one leaf of each plant. They were checked for live mites and eggs after 1, 7 and 14 days. The number of live mites and eggs determined by the checks are listed in the following table.

TABLE

| Compound | Concentration, percent | 1 day | | 7 days | | 14 days | |
|---|---|---|---|---|---|---|---|
| | | Mites | Eggs | Mites | Eggs | Mites | Eggs |
| 3-(methyl-carbamoyloximino)-azacycloheptan-2-one. | 0.01 | 0 | 6 | 0 | 0 | 0 | 0 |
| | 0.005 | 0 | 3 | 0 | 0 | 0 | 0 |
| | 0.0025 | 0 | 5 | 0 | 0 | 0 | 0 |
| | 0.0012 | 0 | 10 | 0 | 0 | 0 | 0 |
| 1-(methylcarbamoyl)-3-(methyl-carbamoyloximino)-azacycloheptan-2-one. | 0.005 | 1 | 1 | 0 | 0 | 0 | 0 |
| | 0.0025 | 1 | 4 | 1 | 0 | 0 | 0 |
| | 0.0012 | 3 | 7 | 3 | 1 | 1 | 0 |

Nematocidal effect

To test the effectiveness against soil nematodes, the active substance is added in the given concentrations to soil infested with root gall nematodes (meloidogyne arenaria) and intimately mixed. In test series A, young tomato plants are transplanted into the prepared soil, and in test series B, tomato seeds are sown after a waiting period of 8 days.

To evaluate the nematocidal effect, the number of galls found the roots of the plants are counted 28 days after planting or sowing, respectively. The following scale is used for the evaluation:

0=complete nematocidal effect=no infestation
5=no nematocidal effect=same infestation as the control
2–4=intermediary degrees of infestation

| | Nematocidal effect with a concentration of acitve substance of — | | | | | |
|---|---|---|---|---|---|---|
| | 0.02% | | 0.005% | | 0.001% | |
| Active substance | A | B | A | B | A | B |
| 3-(methyl-carbamoyloximino)-azacycloheptan-2-one | 0 | 0 | 0 | 0 | 3 | 1 |

The following examples illustrate the process according to the invention. The temperatures are given in degrees centigrade.

EXAMPLE 1

6 g. of methyl isocyanate are added dropwise with stirring at room temperature to a suspension of 15 g. of 3-hydroxyiminoazacycloheptan-2-one and 3 ml. of triethylamine in 180 ml. of acetone. After the reaction has subsided, the reaction mixture is stirred for 12 hours at room temperature. The triethylamine hydrochloride which crystallizes is separated and the filtrate is concentrated. After cooling, the reaction product crystallizes. After recrystallization from tetrahydrofuran/pentane, the 3-(methyl-carbamoyloximino)-azacycloheptan-2-one has a melting point of 132–133°.

EXAMPLE 2

6.9 g. of 50% suspension of sodium hydride in paraffin oil are treated with 200 ml. of tetrahydrofuran. Nitrogen gas is introduced into this mixture and a suspension of 14.2 g. of 3-hydroxyimino-azacloheptan-2-one in 100 ml. of tetrahydrofuran is added dropwise at room temperature. The reaction mixture is then heated to 40–50°, subsequently treated in a solution of 16.1 g. dimethylcarbamic acid chloride in 100 ml. of tetrahydrofuran and heated to 50–60°. The precipitate is removed by filtration and the filtrate is concentrated in vacuum. The residue is washed several times with hexane to remove the paraffin oil. The 3-(N,N-dimethyl-carbamoyloximino)-azacycloheptan-2-one is recrystallized from tetrahydrofuran/ petroleum ether.

The following compounds are obtained in the manner described in the preceding examples:

3-(ethyl-carbamoyloximino)-azacycloheptan-2-one, M.P. 105–108° (decomposition)
3-(n-propyl-carbamoyloximino)-azacycloheptan-2-one, M.P. 93–96°
3-(n-butyl-carbamoyloximino-azacycloheptan-2-one, M.P. 97–99°
3-(n-octyl-carbamoyloximino)-azacycloheptan-2-one, M.P. 61–64°
3-(n-dodecyl-carbamoyloximino)-azacycloheptan-2-one, M.P. 76°
3-(n-tetradecyl-carbamoyloximino)-azacycloheptan-2-one,
3-(octadecyl-carbamoyloximino)-azacycloheptan-2-one, M.P. 88–89°
3-(octahydromethenopentalenyl-carbamoyloximino)-azacycloheptan-2-one, M.P. 162–164° (decomposition)
3-(methyl-carbamoyloximino)-5-tert-butyl-azacycloheptan-2-one,
3-(sec-butyl-carbamoyloximino)-5-tert-butyl-azacycloheptan-2-one,
3-(cyclopropyl-carbamoyloximino)-azacycloheptan-2-one,
3-(methylcyclopropyl-carbamoyloximino)-azacycloheptan-2-one,
3-(cyclopentyl-carbamoyloximino)-azacycloheptan-2-one,
3-(3-methyl-6-isopropyl-cyclohexyl-carbamoyloximino)-azacycloheptan-2-one, M.P. 137–138°
3-(1',3',3'-trimethyl-norbornyl-carbamoyloximino)-azacycloheptan-2-one, M.P. 148–150°
3-(bornyl-carbamoyloximino)-azacycloheptan-2-one, M.P. 159–161°
3-(bicyclo[4.1.0]heptyl(7)-carbamoyloximino)-azacycloheptan-2-one, M.P. 120–122 (decomposition)
3-(cyclohexyl-carbamoyloximino)-azacycloheptan-2-one, M.P. 131–134°
3-(N-methyl-N-cyclohexyl-carbamoyloximino)-azacycloheptan-2-one,
3-(N-methyl-N-cyclopropyl-carbamoyloximino)-azacycloheptan-2-one,
3-(allyl-carbamoyloximino)-azacycloheptan-2-one, M.P. 81–87°
3-(N,N-diallyl-carbamoyloximino)-azacycloheptan-2-one,
3-(methallyl-carbamoyloximino)-azacycloheptan-2-one,
3-(chlorallyl-carbamoyl-oximino)-azacycloheptan-2-one,
3-(allyl-carbamoyloximino)-5-tert-butyl-azacycloheptan-2-one,
3-(phenyl-carbamoyloximino)-azacycloheptan-2-one, M.P. 130–132°
3-(4'-chlorophenyl-carbamoyloximino)-azacycloheptan-2-one, M.P. 145–146°
3-(3',4'-dichlorophenyl-carbamoyloximino)-azacycloheptan-2-one, M.P. 144–146°
3-(3'-tolyl-carbamoyloximino)-azacycloheptan-2-one,
3-(4'-methoxyphenyl-carbamoyloximino)-azacycloheptan-2-one,
3-(N-methyl-N-phenyl-carbamoyloximino)-azacycloheptan-2-one,
3-(N-methyl-N-4'-chlorophenyl-carbamoyloximino)-azacycloheptan-2-one,
3-(benzyl-carbamoyloximino)-azacycloheptan-2-one, M.P. 158–160°
3-(4'-chlorobenzyl-carbamoyloximino)-azacycloheptan-2-one,
3-(phenethyl-carbamoyloximino)-azacycloheptan-2-one,
3-(4'-chlorophenyl-carbamoyloximino)-5-tert-butyl-azacycloheptan-2-one,
3-(4'-chlorobenzyl-carbamoyloximino)-5-tert-butyl-azacycloheptan-2-one,
3-(4'nitrophenyl-carbamoyloximino)-azacycloheptan-2-one, M.P. 186–190° (decomposition)
3-(pyrrolidino-carbonyloximino)-azacycloheptan-2-one,
3-(piperidino-carbonyloximino)-azacycloheptan-2-one,
3-(azepino-carbonyloximino)-azacycloheptan-2-one,
3-(morpholino-carbonyloximino)azacycloheptan-2-one,
3-(pyrrolidino-carbonyloximino)-5-tert-butyl-azacycloheptan-2-one,
3-(isopropyl-methyl-carbamoyloximino)-azacycloheptan-2-one,
3-(di-n-octyl-carbamoyloximino)-azacycloheptan-2-one,
3-(di-n-tetradecyl-carbamoyloximino)-azacycloheptan-2-one,
3-(diethyl-carbamoyloximino)-azacycloheptan-2-one,
3-(di-n-propyl-carbamoyloximino)-azacycloheptan-2-one,
3-(di-n-butyl-carbamoyloximino)-azacycloheptan-2-one,
3-(N-methyl-N-n-butyl-carbamoyloximino)-azacycloheptan-2-one,
3-(N-methyl-N-n-octyl-carbamoyloximino)-azacycloheptan-2-one,
3-(N-methyl-N-dodecyl-carbamoyloximino)-azacycloheptan-2-one,
3-(dimethyl-carbamoyloximino)-5-tert-butyl-azacycloheptan-2-one,
3-(diethyl-carbamoyloximino)-5-tert-butyl-azacycloheptan-2-one,
3-(di-n-propyl-carbamoyloximino)-5-tert-butyl-azacycloheptan-2-one,
3-(N-methyl-N-n-butyl-carbamoyloximino)-5-tert-butyl-azacycloheptan-2-one.

EXAMPLE 3

(a) To a stirred suspension of 14.2 g. (0.1 mole) of azacycloheptandion(2,3)-oxime(3) in 170 ml. of absolute acetone and 7 ml. of triethylamine are added dropwise at room temperature during one hour 22.8 g. (0.4 mole) of methylisocyanate. The reaction mixture is stirred for another 12 hours and then concentrated under reduced pressure. The residue is recrystallized from a tetrahydrofuran-pentane mixture. Thus 1-(methyl-carbamoyl)-3-(methyl-carbamoyloximino)-azacycloheptan-2-one, M.P. 148–151° is obtained. The yield is 10.9 grams or 42.6% of the theory.

(b) A mixture of 10.0 g. (0.05 mole) of 3-methylcarbamoyl-oximino)-azacycloheptan-2-one (see Example 1) in 100 ml. of toluene, 20 ml. of absolute pyridine and 3.9 g. (0.07 mole) of methylisocyanate is heated under reflux at 90° for 15 hours. The reaction mixture is then concentrated by distilling the solvents and the residue is poured into water. The aqueous suspension is extracted with ether. The residue of these ethereal extracts is recrystallized from pentane and ethyl acetate and thus 6.0 g. (47% of the theorie) of 1-(methyl-carbamoyl)-3-(methyl-carbamoyloximino)-azacyclheptan-2-one of M.P. 149–151° are obtained.

EXAMPLE 4

A mixture of 10.0 g. (0.05 mole) of 3-(methyl-carbamoyl-oximino)-azacycloheptan-2-one (see Example 1), 150 ml. of absolute toluene, 20 ml. of absolute pyridine and 10.9 g. (0.1 mole) of n-butyl-isocyanate are heated under reflux to 100° for 6 hours. The mixture is then concentrated to dryness under reduced pressure and the residue is taken up by ether and water. The ethereal layer is washed until the washing water is neutral and then concentrated. The remaining oily residue is purified by chromatography over a column of 400 g. of silica gel, and elution with a mixture of benzene/chloroform/ethanol 3:1:1. The eluate is concentrated and the residue recrystallized from an ether-pentane mixture. Thus pure 1-(n-butyl-carbamoyl) - 3 - (methyl-carbamoyl-oximino)-azacycloheptan-2-one, M.P. 71–72° is obtained.

In an analogous manner to Examples 3 and 4 the following compounds were prepared:

1-(ethyl-carbamoyl)-3-(methyl-carbamoyloximino)-azacycloheptan-2-one, M.P. 135–136°
1-(n-propyl-carbamoyl)-3-(methyl-carbamoyloximino)-azacycloheptan-2-one, M.P. 95–96°
1-(cyclohexyl-carbamoyl)-3-(methyl-carbamoyloximino)-azacycloheptan-2-one, oil $n_D^{50}$ 1.5175
1-(benzyl-carbamoyl)-3-(methyl-carbamoyloximino)-azacycloheptan-2-one, oil $n_D^{50}$ 1.5361
1-(ethyl-carbamoyl)-3-(benzyl-carbamoyloximino)-azacycloheptan-2-one, oil $n_D^{50}$ 1.5389
1-(phenyl-carbamoyl)-3-(phenyl-carbamoyloximino)-azacycloheptan-2-one.

The production of pesticidal agents according to the invention is performed in a known manner by intimate mixing and grinding of active substances of the Formula I together with suitable carriers, optionally with the addition of dispersing agents or solvents, which are inert towards the active substances. The novel active substance can be prepared in the following forms:

solid preparations: dusts, scattering agents, granulates, (coated granulates, impregnated granulates and homogeneous granulates);
water-dispersible concentrates of the active substance: wettable powders, pastes, emulsions;
liquid preparations: solutions, aerosols.

The concentration of active substance in these preparations is from 0.01 to 80%. Other biocidally active substances or agents can be admixed with the agents described according to the invention. Thus, in addition to the said active substances of the Formula I, the new agents may contain, for example, other insecticides, fungicides, bactericides, fungistatic and bacterostatic substances or other nematocides in order to broaden the range of action. The agents according to the invention may also contain plant fertilizers, trace elements, etc.

The novel active substances are used for soil disinfection in the form of solid or liquid agents. For soil disinfection, those agents which assure an even distribution of the active substance throughout a layer of soil 15 to 25 cm. deep are especially favorable. The method and form of application are, in particular, dependent upon the type of soil pests to be controlled, the climate and the nature of the soil. Since the novel active substances are not phytotoxic and do not adversely affect germination, they can be used immediately before or after sowing or planting without observing a waiting time. Likewise, standing crops can be treated with the novel agents. Since the active substances have pronounced systemic properties, they can be simply applied to the parts of the plants above the soil.

The following forms for application of the pesticides according to the invention serve to illustrate the invention; where not expressly stated otherwise, "parts" mean parts by weight.

Dust

The following ingredients are used to produce (a) a 10%, (b) a 5% and (c) a 2% dust:

(a)

10 parts of 3-(ethyl-carbamoyloximino)-azacycloheptan-2-one,
5 parts of highly dispersed silicic acid,
85 parts of talcum;

(b)

5 parts of 3-(methyl-carbamoyloximino)-azacycloheptan-2-one,
95 parts of talcum;

(c)

2 parts of 3-n-propyl-carbamoyloximino)-azacycloheptan-2-one,
1 part of highly dispersed silicic acid,
97 parts of talcum.

The active substances are mixed and ground with the carriers. The dusts obtained are used, for example, for the control of soil insects and the various developmental stages of insects, which live in the soil.

Scattering agent

The following ingredients are used to produce a 5% scattering agent:

5 parts of 3-(methyl-cabamoyloximino)-azacycloheptan-2-one,
35 parts of talcum,
60 parts of calcium carbonate.

The active substances are mixed and ground with the carriers. The scattering agents obtained are used, for example, for the protection of plants by working them into the soil for the control of nematodes.

Granulate

The following ingredients are used to produce a 5% granulate:

5 parts of 3-(methyl-cabamoyloximino)-azacycloheptan-2-one,
3 parts of polyethylene glycol,
0.5 part of light silicic acid,
91.5 parts of ground limestone (0.4*0.8 mm. diam.);

The following ingredients are used to produce a 10% granulate:

10 parts of 1-(methyl-carbamoyl)-3-(methyl-carbamoyloximino)-azacycloheptan-2-one,
3 parts of polyethylene glycol,
1 part of light silicic acid,
86 parts of ground limestone (0.4 to 0.8 mm. diam.).

The active ingredient is dissolved in alcohol and, together with the polyethylene glycol, is adsorbed onto the ground limestone. With continuous stirring, the alcohol evaporates. Finally the light silicic acid is added and mixed until the granulate is homogeneous. The resultant granulate is suitable for the protection of plants and stored goods.

Wettable powder

For the production of (a) a 50%, (b) a 40%, (c) a 25% and (d) a 10% wettable powder, the following components are used:

(a)

50 parts of 3-(ethyl-carbamoyloximino)-azacycloheptan-2-one,
5 parts of naphthalene sulfonic acid/benzene sulfonic acid/formaldehyde condensation product,
5 parts of dibutyl-naphthalene sulfonic acid,
5 parts of Champagne chalk,
20 parts of silicic acid,
15 parts of kaolin;

(b)

40 parts of 3-(methyl-carbamoyloximino)-azacycloheptan-2-one,
1 part of dibutyl-naphthalene sulfonic acid,
5 parts of sodium lignin-sulfonate,
2 parts of Champagne chalk/hydroxyethyl cellulose mixture (1:1),
30 parts of kaolin,
22 parts of sodium aluminum silicate;

(c)

25 parts of 3-(octadecyl-carbamoyloximino)-azacycloheptan-2-one,
5 parts of sodium oleyl methyl tauride,
2.5 parts of naphthalene sulfonic acid/formaldehyde condensation product,
0.5 part of carboxymethyl cellulose,
5 parts of neutral potassium aluminum silicate,
62 parts of talcum;

(d)

10 parts of 3-(allyl-carbamoyloximino)-azacycloheptan-2-one,
3 parts of a mixture of the sodium salts of saturated fatty alcohol sulfates,
5 parts of naphthalene sulfonic acid/formaldehyde condensation product,
82 parts of kaolin.

The active ingredients are intimately mixed with the additives in suitable mixers and ground in suitable mills and rollers. Wettable powders are obtained which can be diluted with water to form suspensions of any desired concentration. Such ssuspensions are used primarily for the protection of plants.

Paste

The following ingredients are used to produce a 45% paste:

45 parts of 3-(methyl-carbamoyloximino)-azacycloheptan-2-one,
5 parts of sodium aluminum silicate,
14 parts of cetyl polyglycol ether with 8 mol of ethylene oxide,
1 part of oleyl polyglycol ether with 5 mol of ethylene oxide,
2 parts of spindle oil,
10 parts of polyethylene glycol,
23 parts of water.

The active ingredient is intimately mixed and ground with the additives in apparatus suitable therefor. A paste is obtained from which, by dilution with water, suspensions of any concentration desired can be produced. These suspensions are used mainly for the control of spider mites in fruit plantations.

Emulsion

To produce a 10% emulsion concentrate, 10 parts of 3-(methyl-carbamoyloximino)-azacycloheptan-2-one,
55 parts of xylene,
32 parts of dimethylformamide, and
3 parts of an emulsifying agent (nonylphenol/polyoxyethylene/calcium dodecylbenzenesulfonate)

are mixed together.

To produce a 20% emulsion concentrate, 20 parts of 1-(methyl-carbamoyl)-3-(methyl-carbamoyloximino)-azacycloheptan-2-one are dissolved in 80 parts of dimethyl formamide.

These concentrates can be diluted with water to form emulsions having concentrations suitable for the protection of plants and stored goods.

What we claim is:
1. 3 - (methyl-carbamoyloximino)-azacycloheptan-2-one.
2. 3 - (ethyl-carbamoyloximino)-azacycloheptan-2-one.
3. 1 - (methyl-carbamoyl) - 3 - (methyl-carbamoyloximino)-azacycloheptan-2-one.

References Cited

UNITED STATES PATENTS 2,938,029   5/1960   Brenner et al. ____ 260—239.3 R

FOREIGN PATENTS 3,111   4/1963   Japan _____ 260—239.3 R
3,112   4/1963   Japan _____ 260—239.3 R

OTHER REFERENCES

Fukumoto et al.: "Nippon Kagaku Zasshi," vol. 84, No. 9 (1963), pp. 736–744.

HENRY R. JILES, Primary Examiner

R. T. BOND, Assistant Examiner

U.S. Cl. X.R.

424—244, 248, 250, 267, 274, 275

UNITED STATES PATENT OFFICE
CERTIFICATE OF CORRECTION

Patent No. 3,801,571  Dated April 2, 1974

Inventor(s) Erika Reichel and Karl Gätzi

It is certified that error appears in the above-identified patent and that said Letters Patent are hereby corrected as shown below:

In the heading, insert:

Claims priority, applications Switzerland, July 16, 1969 (No. 10834/69) and June 11, 1970 (No. 8774/70).

Signed and sealed this 19th day of November 1974.

(SEAL)
Attest:

McCOY M. GIBSON JR.
Attesting Officer

C. MARSHALL DANN
Commissioner of Patents